United States Patent [19]

Demiryont

[11] Patent Number: 4,993,810
[45] Date of Patent: Feb. 19, 1991

[54] ELECTROCHROMIC DEVICES COMPRISING METAL SALTS IN AN ION CONDUCTIVE MATERIAL

[75] Inventor: Hulya Demiryont, Dearborn, Mich.

[73] Assignee: Ford Motor Company, Dearborn, Mich.

[21] Appl. No.: 338,261

[22] Filed: Apr. 14, 1989

[51] Int. Cl.⁵ .............................................. G02F 1/01
[52] U.S. Cl. ..................................................... 350/357
[58] Field of Search ......................................... 350/357

[56] References Cited

U.S. PATENT DOCUMENTS

| Re. 33,040 | 8/1989 | Kakiuchi | 350/357 |
| 3,712,709 | 1/1973 | Kenworthy | 350/357 |
| 3,774,988 | 11/1973 | Rogers | 350/390 |
| 4,009,936 | 3/1977 | Kasai | 350/357 |
| 4,211,475 | 7/1980 | Malugani et al. | 350/357 |
| 4,550,982 | 11/1985 | Hirai | 350/357 |
| 4,573,768 | 3/1986 | Polak et al. | 350/357 |
| 4,693,564 | 9/1987 | Mori | 350/357 |

FOREIGN PATENT DOCUMENTS

| 0014176 | 2/1978 | Japan | 350/357 |
| 1052633 | 3/1986 | Japan | 350/357 |
| 0153624 | 7/1986 | Japan | 350/357 |
| 3144327 | 6/1988 | Japan | 350/357 |

Primary Examiner—Eugene R. LaRoche
Assistant Examiner—Evelyn A. Lester
Attorney, Agent, or Firm—Lorraine S. Melotik; Roger L. May

[57] ABSTRACT

This invention is directed to an electrochromic device which comprises a colorable electrochromic matrix layer consisting essentially of certain metal salts and an ion conduction enhancer in an ion conductive material.

17 Claims, 1 Drawing Sheet

४,९९३,८१०

ELECTROCHROMIC DEVICES COMPRISING METAL SALTS IN AN ION CONDUCTIVE MATERIAL

FIELD OF THE INVENTION

The present invention relates to electrochromic devices which exhibit coloration and bleaching thereof due to an induced electric field. More particularly, this invention relates to electrochromic devices which include a layer comprising metal salts dispersed or dissolved in an ion conductive material. Herein this layer is termed an "electrochromic matrix material layer".

BACKGROUND OF THE INVENTION

In an electrochromic device, a physical/chemical change is produced in response to an induced electric field. The result is a change in the reflective (or transmissive) properties of the device with respect to electromagnetic radiations, e.g., UV, visible and IR radiations. Such devices, one embodiment being shown as item 10 in FIG. 1, generally comprise a film of electrochromic material 12 and an ion-conductive insulating layer 14 which functions as an electrolyte layer. The film and the electrolyte layer are in surface contact with each other for exchange of ions between the electrochromic film and the electrolyte layer. Two conductive electrode layers, 16 and 18 in FIG. 1, at least one of them being transparent, are disposed on the opposite outer surfaces of the film and the electrolyte layer to provide means for applying a voltage across the combined thickness of the electrochromic film and the electrolyte layer. As shown in FIG. 1, electrode layers are provided on substrates 20 and 22, which substrates may be of a material such as glass. Depending on the ion providing and ion storage capacity of ion conductive layer 16, a counter electrode located between ion conductive layer 14 and electrode layer 18 may be used. The electrodes are provided with external electrical leads 24 and 26 connected to a voltage providing source 28. Application of a voltage of proper polarity across the electrodes causes coloration of the electrochromic layer. By reversing the polarity of the applied voltage, the colored electrochromic layer will be uncolored (bleached). Changing from the bleached state to the colored state or from the colored state to the bleached state is termed "switching". The electrochromic material may be "persistent" in its colored state which means that it has the ability to remain, after removal of the electric field, in the absorptive state to which it is changed, as distinguished from a substantially instantaneous reversion to the initial state. The length of time a material is persistent is called its "open circuit memory" or simply "memory". Electrochromic devices of this type have been described for several uses, such as for image display, for light filtering, etc. See, e.g., U.S. Pat. Nos. 3,708,220, 4,194,812; 4,278,329; 4,645,308; 4,436,769; 4,500,878; 4,150,879; 4,652,090; 4,505,021; and 4,664,934.

In such devices, the electrochromic film usually comprises an inorganic metal oxide material, most commonly a transition metal oxide, in particular: tungsten oxide. When tungsten oxide is the electrochromic material, the electrolyte layer is adapted to provide a positively charged light cation, preferably, a proton or a lithium ion. The electrolyte layer may be a liquid electrolyte solution like lithium perchlorate in propylene carbonate or a gel electrolyte like polyvinyl butyral methanol doped with LiCl. The electrolyte layer may also be a solid electrolyte which comprises polymers or copolymers containing acidic groups such as polystyrene sulfonic acid, propylene oxide or polyethylene oxide.

It would be desirable, however, to have an electrochromic device which comprises less layers and is hence less complex to fabricate. Additionally, it would be desirable if the device, in addition to being able to reduce transmission of visible light, would also be able to substantially reduce transmission of IR wavelength radiation, i.e., keep radiation of the type which generates heat from passing through the device. This would be particularly useful if the device is used as a window of a building or automobile.

BRIEF DESCRIPTION OF THE INVENTION

The present invention is directed to an electrochromic device comprising a substrate; a first electrode member provided on the substrate; an electrochromic matrix material layer in contact with the first electrode member; and a second electrode member in contact with the electrochromic matrix material layer, at least one of the first and second electrode members being transparent, the electrochromic matrix material layer consisting essentially of a substantially uniform mixture of: (i) a metal salt component selected from the group consisting essentially of halides, acetates, nitrates, sulfates, and phosphates of metals selected from the group consisting essentially of copper, cobalt, nickel, lead, molybdenum, rubidium and tin; (ii) an ion conductive material component selected from a group consisting essentially of solid electrolytes and gel electrolytes; and an ion conduction enhancer component selected from the group consisting essentially of lithium salts and sodium salts. Preferably, the metal salt is present in the matrix layer in an amount sufficient to provide a maximum thickness of between about 500 to 1000Å of the metal on an electrode member when a voltage is applied across the electrodes. The device may further comprise a second substrate adjacent to the second electrode member. According to another aspect of the invention, it is directed to the method of making the above device.

When a voltage is applied across the electrodes of the device, the electrode member which functions as the cathode takes on a metallic appearance which makes the device useful as a display device. Additionally, embodiments of this device are particularly useful as windows of buildings or automobiles since they are capable of more effectively reflecting IR radiation than are conventional electrochromic devices. Thus embodiments of the present invention device, if used as windows, offer an enhanced ability over prior art electrochromic devices to keep heat out of the building or automobile, while at the same time being capable of keeping heat within the building or automobile from escaping through the device. This is in addition to the ability of these devices to control the amount of visible light which may enter the building or vehicle. Still further, it has been found that embodiments of the device of the present invention are able to be switched to the colored state by means of a relatively low voltage applied across the electrodes.

The thickness of the metallic layer formed during operation of the device and hence the corresponding reduction in transmission of radiation by the device can be controlled by the length of time a voltage is applied across the electrodes of the device. That is, the longer the voltage is applied, the thicker the metallic layer formed with a corresponding increased reduction in transmission of radiation through the device. Thus the device advantageously has a variable and controllable transmittance. According to aspects of the invention comprising a linear cathodic electrode which is discussed in detail hereinafter, it is also advantageously possible to provide a device having a metallic layer of graded thickness so as to provide different portions of the device with varying transmission levels.

DETAILED DESCRIPTION OF THE INVENTION

As disclosed above, the electrochromic device of this invention comprises a substrate; a first electrode member; an electrochromic matrix material layer; and a second electrode member. The electrochromic matrix material layer (prior to application of a voltage across the electrode members) consists essentially of a substantially uniform mixture of (i) a metal salt component, (ii) an ion conductive enhancer component and (iii) an ion conductive material component. The device may further comprise a second substrate adjacent to the second electrode member.

Figure 1:
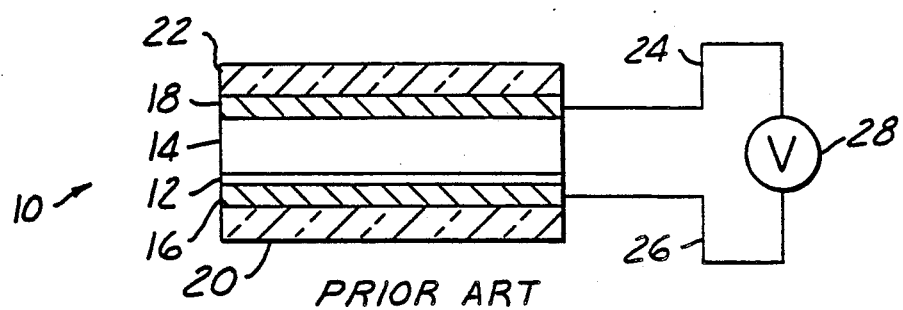
FIG. 1 is a schematic representation of an electrochromic device, in cross-section, according to the prior art.
Figure 2:
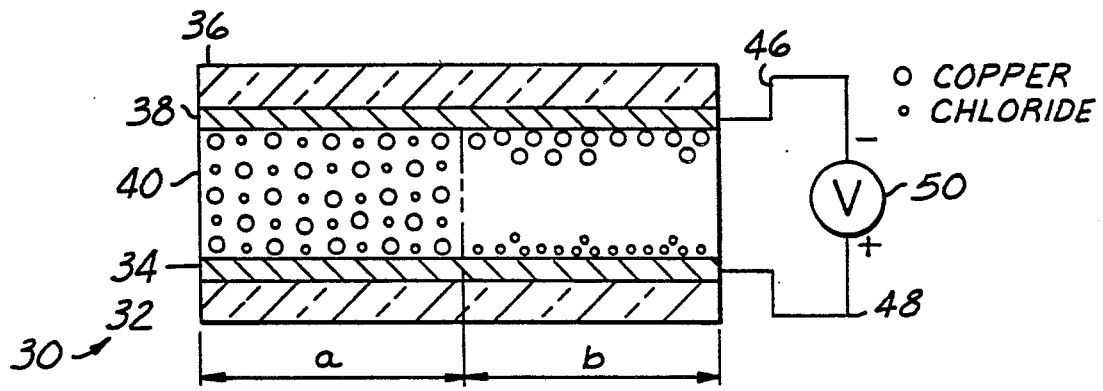
FIG. 2 is a schematic representations of an embodiment of an electrochromic device, in cross-section, according to this invention, before and after a voltage is applied across the electrodes of the device.

One aspect of the invention will be further understood by reference to FIG. 2. This figure depicts a cross-sectional view of an embodiment of a device 30 according to the invention taken along a line perpendicular to a surface of a substrate of the device, before and after application of a voltage across the electrodes of the device. The device 30 in FIG. 2 comprises glass substrate 32 in contact with transparent electrode member 34 and glass substrate 36 in contact with transparent electrode member 38. The device further comprises a layer of electrochromic matrix material 40 according to the present invention, shown before, "a", and after, "b", application of a voltage across the electrodes. The electrochromic matrix layer 40 (before application of a voltage across the electrodes) consists essentially of a substantially uniform mixture of components (i), (ii), and (iii) as described above. In the particular embodiment shown in FIG. 2, these components are copper chloride, lithium nitrate and polyvinyl butyral gel, respectively. Section "a" of the matrix material layer 40 of the FIG. 2 device 30 shows the copper chloride (metal salt component) substantially uniformly dispersed throughout the matrix layer. Although not shown, the ion conduction enhancer also would be substantially uniformly dispersed throughout the matrix material layer 40, section "a". This particular embodiment of the matrix material layer would appear light yellow in color as initially provided in the device, i.e., prior to application of a voltage across the electrodes. The intensity of the color of the initial transparent, yellow matrix layer would depend only on the concentration of the copper chloride in the matrix material since the ion conduction enhancer present in the matrix material is colorless. Increasing the amount of ion conduction enhancer, however, serves to increase the conductivity of the ion conductive material component (i.e., the electrolyte) which, in turn, increases the rate at which a metal layer is formed at an electrode member when a voltage is applied.

During operation of the device, a voltage is applied across the electrodes by means of leads 46 and 48 connected to a d.c. voltage source 50 as shown in FIG. 2. When a voltage is applied across the electrodes, it is believed that the metal ions (cations) of the metal salt present in the matrix material layer 40 migrate toward the electrode member of negative polarity 38 (i.e., cathode or "working electrode") as shown in FIG. 2, section "b". The metal ions would be converted to metal atoms at the cathode 38 to provide a metal layer thereon and provide a metallic reflective layer to the device which would inhibit transmission of impinging radiation through the device. In the particular matrix layer described above, the matrix layer (and thus the device) would change from a light yellow transparent layer having a transmittance of perhaps about 60% (depending on the metal salt concentration) to an opaque (i.e., having about 0% transmittance) layer comprising a metallic copper layer. The transparency (or opaqueness) of the device after a voltage has been applied would depend on the thickness of the metal layer (in this instance, copper) which plates out on the cathode. A thicker metal layer would provide a less transparent device. The anions of the metal salt (e.g., the chloride ions of the particular embodiment discussed above) would be expected to migrate toward the positive electrode member (i.e., anode) if the ion conductive material allows for the ionic transport of the anion, as shown in FIG. 2, section "b". In this particular embodiment of the device, some of the chloride ions may be oxidized to chlorine gas at the anode. The use of a counter electrode between the matrix material layer and the anode of the device is useful to minimize formation of gas at the anode. U.S. Pat. 4,768,865 discloses that formation of gas at an anode of an electrochromic device may be minimized by use of a grid shaped anode.

If the ion conductive material allows for the ionic transport of the cation and anion of the ion conduction enhancer, they would also be expected to move toward the cathode and anode, respectively.

Generally, it has been found that the device of this invention has a short term memory, i.e., it readily reverts to its initial (uncolored) state when the applied electric field is removed. For example, in the particular embodiment device described above, when the electric field is removed the metallic copper layer disappears and the matrix material layer returns to its initial light yellow color. It is believed that this switching to the initial state takes place spontaneously because of the residual negative charge present in the matrix material layer. If it is desired to switch the device more rapidly to its initial state, the polarity of the applied electric field can be reversed. That is, a voltage of positive polarity would be applied to electrode member 38 and a voltage of negative polarity would be applied to electrode member 34. If the electric field is maintained in this reversed polarity for a time after the device has been switched to its initial state, a metal layer will begin to form at electrode member 34. While certain theories have been suggested above to explain the working of the invention device, neither their validity nor their understanding is necessary for a practice of this invention.

As discussed above, the invention device comprises a substrate on which is provided a first electrode member. This electrode member may function as the cathode or anode as will be apparent in view of the present disclosure. Additionally, the device may further comprise a second substrate adjacent the second electrode member. Generally, this second substrate would be employed to provide a more environmentally durable device. The substrate material employed in the device may comprise any material which is stable at the temperatures and under the conditions of the fabrication and use of the device. Commonly used materials for the substrate(s) of such devices include, e.g., glass, quartz, plastic, and the like and suitable combination of any of them. At least the substrate used adjacent the cathodic electrode will preferably be at least translucent, more preferably being transparent. Selection of the optimal material to be used for one or both substrates of the device is dependent on the particular use desired of the device, as will be apparent to one skilled in the art in view of this disclosure.

The electrode members used in the device of this invention may be any material which is electronically conductive. At least one of the electrodes is transparent, although both may be. This light transmitting, transparent electrode may be a light transmitting film of an electrically conductive metal oxide such as doped or undoped tin oxide, indium oxide, zinc oxide and the like. The transparent electrode member may be provided on a support (i.e., a substrate, matrix material layer, counter electrode layer, etc.) by any known technique, including vacuum evaporation, chemical vapor deposition, sol-gel deposition, ion plating, reactive sputtering, pyrolytic spray deposition etc. The transparent electrode member may be formed by the so-called thick film processes such as screen printing or photolithographic coating. When the thick batch film process are used, (1) a paste containing metal compound micro particles or (2) a solution of an organic metal compound such as metal alcoholate or its oligomer is coated and sintered to form the transparent electrode member. Preferably, the transparent electrode material is tin oxide doped with fluorine. The thickness of the transparent electrode member generally falls within the range of 200 nm to several microns, correspondingly varying in transparency and resistance. The non-transparent electrode material may be selected from light-reflecting electrode materials (e.g., Al, Ag, Pt, Ni or a metal of a metal salt used to form the matrix layer, e.g., Cu) or other electrode materials (e.g., Au, Pd, Cr, Ir, Ru, Rh or C).

Figure 3:
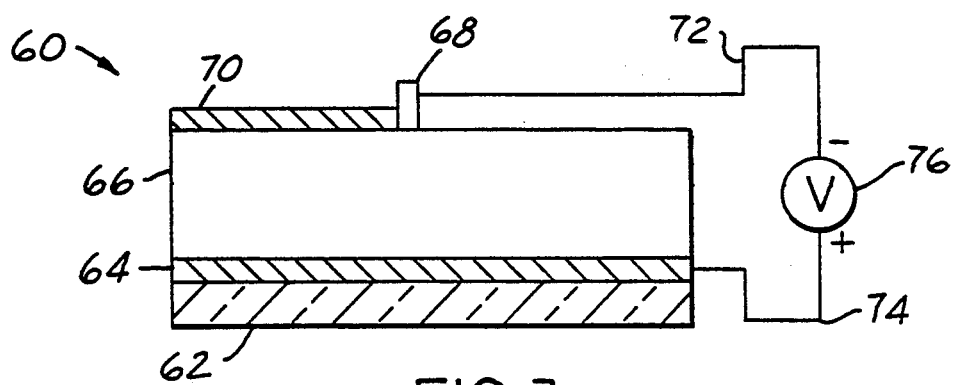
FIG. 3 is a schematic representation of an embodiment of an electrochromic device, in cross-section, according to another aspect of this invention.

The first and second electrode members may be individually selected from various configurations, such as a continuous layer, e.g., one which covers substantially the entire face of the matrix layer, or one which consists of a pattern, e.g., a grid, lines, a segmented design, etc. If the anodic electrode member is not a continuous layer, but rather is a patterned layer, e.g., a grid, it would need to be of suitable grid density to act as an effective anode. Preferably, if the anodic electrode is a metal (non-transparent) electrode member, it is a patterned layer of substantially smaller surface area as compared to the surface area of the anodic electrode member which is preferably transparent. Still further, the cathodic electrode member may be a movable point or line electrode, i.e., a movable electrode which contacts the electrochromic matrix material layer at a point (as by means of an electronically conductive pen) or in a line (straight, curved, etc.) as shown in FIG. 3. In this figure, the electrochromic device 60 comprises a substrate 62 on which is deposited an electrode member (layer) 64, an electrochromic matrix layer 66 deposited on the electrode layer 64 and a linear metal movable electrode member 68 in contact with a portion of the electrochromic matrix layer 66. During operation of device 60, a voltage is applied across the electrodes by means of leads 72 and 74 connected to a d.c. voltage source 76 as shown in FIG. 3. In this device, electrode member 64 functions as an anode and electrode member 68 functions as a cathode. Such a device is useful to provide a metallic layer in the device of variable dimensions which additionally may be graded in thickness, as might be optimal in a building window, with the metallic layer only extending part of the way down the window and the thickest portion of the metallic layer being at the top. As is shown in that figure, as linear electrode member 68 slides (to the right in the figure) along matrix layer 66, a layer of metal 70 plates out on the surface of the matrix material in the region of the movable electrode member 68. This metal layer 70 becomes, in effect, an electrode member (cathode) as long as it is in contact with linear cathodic electrode member 68. Hence, as the bar is moved along the surface of the matrix material, a metal layer 70 is formed which can continue to increase in thickness as long as a voltage is applied. The anodic electrode layer 64 can be continuous or e.g., a grid patterned electrode. If desired, the device including the moveable linear cathodic electrode may include a second substrate, similar in dimension to the first, adjacent the cathodic electrode member to improve the durability of the device. This second substrate may be positioned relatively close to the surface of the matrix layer as long as space is provided for movement of the linear cathodic electrode member.

As will be apparent to those skilled in the art in view of the present disclosure, various combinations of electrode member types (transparent or non-transparent and continuous, patterned, movable or fixed) and substrate may be employed according to this first aspect of the invention. The preferred combination would depend on the intended use of the device. For example, if it was intended to use the device as windows of buildings or the windshield or windows of automobiles where it was desired to form a uniform metallic layer, the device would generally comprise two substrates and both electrode members would be transparent, with at least one of the electrode layers, i.e., the electrode which will be used as a cathode, being continuous. The other electrode layer could be continuous or be, e.g., a grid pattern. In this case, where the cathode is a continuous layer, the application of a voltage as described would cause the entire (cathode) electrode layer to take on a metallic appearance. Another combination of electrodes and substrate(s) could be used, for example, in a display device. In such a device, the working electrode (cathode) could be a transparent and patterned and applied to a transparent substrate. The other electrode (anode) could be a transparent or non-transparent electrode layer, which additionally could be continuous or patterned. It is preferred to use as the working electrode in any of the device mentioned a metal grid electrode which is less likely to allow the formation of gas bubbles at this electrode which could decrease the optical quality of the device. Still other combinations of electrode configuration and type and substrate type (transparent, opaque, etc.) will be apparent to those skilled in the art in view of the present disclosure.

The metal salt component of the electrochromic matrix layer is selected from a coloring component comprising metal salts selected from the group consisting essentially of halides, acetates, nitrates, sulfates, and phosphates of metals selected from the group consisting essentially of copper, cobalt, nickel, lead, rubidium, molybdenum and tin. Mixtures of compatible salts may also be employed as the coloring component. Preferably, the metal salt is present in the layer in an amount sufficient to provide a maximum thickness of between about 500 to 1000Å of metal (from the metal salt) on the electrode layer when a voltage is applied across the electrodes. However, the metal salt may be present in the matrix layer in concentrations greater than this amount. Exemplary of such metal salts are copper chloride, copper iodide, rubidium chloride, lead fluoride, nickel chloride, copper nitrate and cobalt nitrate. The color of the matrix layer of the device, before and after application of a voltage across the electrodes will depend on the particular salt used. For example, the use of a copper salt will give a generally yellow or green color before a voltage is applied and a copper metallic color after a voltage is applied. On the other hand, the use of salts of rubidium, lead, nickel, molybdenum and cobalt will give the matrix the respective color of the particular salt before a voltage is applied and a silver like metal color after a voltage is applied. As will be apparent to those skilled in the art, if a mixture of the metal salts is employed, it would be expected that a unique color would be obtained. The particle size of the metal salt is sufficiently small so as to form a uniform and intimate mixture (which may be a solution or dispersion) of the components of the matrix material.

The ion conductive material (often referred to as an electrolyte) employed in the electrochromic matrix layer is selected from a group consisting essentially of solid ion conducting materials and gel ion conducting materials. The ion conductive material is a dielectric material which is conductive to ions but serves as an insulator for electrons. The ion conductive material would need to be ionically conducting to at least the metal ions of the metal salt. Generally, the ion conductive material would preferably have an ionic conductivity of at least $10^{-5}$ (ohm·cm)$^{-1}$ and a negligible electronic conductivity, preferably less than about $10^{-7}$ (ohm·cm)$^{-1}$. Exemplary of such solid ion conducting materials are metal oxides such as tantalum oxide ($Ta_2O_5$), niobium oxide ($Nb_2O_5$), zirconium oxide ($ZrO_2$), titanium oxide ($TiO_2$), hafnium oxide ($HfO_2$), alumina ($Al_2O_3$), yttrium oxide ($Y_2O_3$), lanthanum oxide ($La_2O_3$), and silicon oxide ($SiO_2$), which can be made by various techniques including sol-gel technology. Other suitable solid electrolyte materials include magnesium fluoride, lithium nitrate ($Li_3N$), zirconium phosphate, sodium chloride, potassium chloride, sodium bromide, potassium bromide, $Na_3Zr_2Si_2PO_{12}$, $Na_5YSi_4O_{12}$, or $Na_{1+x}ZrSi_xP_{3-x}O_{12}$. Compatible mixtures of solid electrolytes may also be employed herein. Generally if the electrochromic device according to this invention employs only one substrate, the ion conductive material would preferably be a solid material.

The ion conductive material may also be a gel electrolyte such as a synthetic resin copolymer of $\phi$-hydroxyethyl methacrylate with 2-acrylamide-2-methylpropane sulfonic acid, a hydrate vinyl copolymer (e.g., a hydrate methyl methacrylate copolymer), or a hydrate polyester. Exemplary of still other (semi-solid) gel electrolytes useful as the ion conductive layer are those, for example, obtained by gelling an electrolytic aqueous solution with a gelling agent (e.g., polyvinyl alcohol, CMC, agar-agar or gelatin). Gel electrolytes are preferred in this invention because they provide the device with a faster response time (faster coloring and bleaching) than devices employing solid electrolyte materials. Still further, use of a solid oxide electrolyte material requires that the oxide have some porosity in order to allow for a sufficiently interface area at the electrode-matrix interface for formation of the metal layer.

The preferred ion conductive material component is one having adhesive properties and made of a polymer electrolyte such as polyvinyl butyral, polyvinyl alcohol, polyacrylic acid and polyvinyl acetate. An adhesive agent having amino groups such as aminosilane, vinyl pyridine, nylon, or copolymers thereof is often optimally used to improve adhesion to the adjacent material. Polymer electrolytes used as ion-exchange membranes can also be used as the electrolyte in the present invention. Among these polymers, polyvinyl butyral is optimum in view of weathering resistance and adhesiveness.

While the copper salts, molybdenum salts and rubidium salts employed as the coloring component herein are optimally suited to be employed dissolved or dispersed in either a solid or gel electrolyte, the salts of cobalt, nickel, lead and tin preferably are employed in gel electrolytes for optimal performance of the device.

The ion conduction enhancer of the electrochromic matrix layer is selected from the group consisting essentially of lithium salts and sodium salts, and compatible mixtures thereof. Most preferably, such compounds are selected from nitrate salts and halide salts, preferably chloride salts, of these alkali metals. The preferred amount of ion conduction enhancer to be employed in the matrix material layer would depend on various factors, including the particular ion conductive material and metal salt employed in the matrix layer, coloring rate desired, etc. Selection of the optimal ion conductive enhancer as well as its concentration in the matrix material layer will be apparent to one skilled in the art in view of this disclosure.

The components of the electrochromic matrix layer, including optional components such as adhesives, background providing materials (e.g., $TiO_2$ which provides a white opaqueness particularly used in display devices) are combined to form a substantially uniform mixture of the components. If using all solid components, the particulate components could be mixed using a common solvent, dried and layered by a coating technique or compressed into a solid material in the device. Another way to form the layer is to codeposit the various components on an electrode layer by any suitable technique, for example, by vacuum deposition, chemical vapor deposition, electrolytic, thermal evaporation, sputtering, and the like. Still another way to form the solid matrix layer, according to sol-gel techniques, it to combine the metal salt, the materials necessary to form the electrolyte by sol-gel techniques and the ion conduction enhancer and let the material solidify. The gel electrolyte matrix layer can be applied on one of the electrode/substrate combinations and then the other electrode/substrate combination assembled therewith to form the device. The same procedure can be followed for solid electrolytes. Selection of the optimal method, including those specifically not mentioned herein, for combining the components of the matrix layer and its method of its deposition will be apparent to those skilled in the art in view of the present disclosure.

Usually the thickness of the electrochromic matrix material layer is between about 0.1 and 100 microns. When using a polymer adhesive electrolyte component the matrix layer would preferably be between 25 and 100 microns. If the electrolyte material is a solid inorganic material, the matrix layer would preferably be between about 0.5 and 1 micron. The thickness of the matrix may, however, vary considerably and is not meant to be limited to those thicknesses given above. Since a small potential will provide an enormous field strength across very thin films, thinner films are preferred over thicker ones. Optimal thickness, however, also will be determined by the particular composition of the film and the desired maximum thickness of the metal layer which is to be provided on the cathode of the device during coloration. Selection of optimal film thickness will be influenced by the properties of the ion conductive material employed.

As would be apparent to those skilled in the art in view of the present disclosure, the method of this invention is applicable to any electrochromic device. Such devices may comprise other components, e.g., counter electrodes, an electrochromic layer of the conventional type, e.g., $WO_3$, etc. A counter electrode could be employed in this device between the matrix material and the anode of the device (i.e., between layer 40 and electrode 34 in the device of FIG. 2) to improve operation of the device. A counter electrode may be formed of, e.g. $WO_3$ doped with and alkali metal ion. This material is generally not meant to be electrochromic. Additionally it is imagined that the device may be of various shapes or designs. The devices of this invention could be used, for example, to provide areas of privacy at will, e.g., by changing a glass or plastic office wall made according to this invention to a darkened wall (in part or in total) affording privacy within. The present invention might be used to provide the upper portions of windows with the ability to be colored to reduce the transmission of radiation at will. This invention device may be used for privacy as a device between interior portions of automotive vehicles and as interior building partitions. This device may also be used as sunroofs, moonroofs, windows in automobiles and buildings, including skylights in order to reduce visible and IR transmissions. Still other adaptions of the device and method of this invention will be apparent to those skilled in the art in view of the disclosure.

The invention will be further understood by referring to the following detailed examples. It should be understood that the specific examples are presented by way of illustration and not by way of limitation.

EXAMPLE 1

This example illustrates the use of an embodiment of the device of this invention in controlling the amount of light transmitted through a window. Two pieces of glass, 6"×12" each, were coated with a 400 nm thick layers of fluorine doped tin oxide by pyrolytic deposition, which layers each had a sheet resistance of 50 ohms/square. The glass substrate/electrode layer systems allows for a visible transmittance of about 78% of the visible light. In order to form the electrochromic matrix material, two different electrolyte gels of polyvinyl butyral (PVB) were prepared as follows. In the first instance, Monsanto Butvar B-90 (trademark) powder was dissolved in methanol/isopropanol, forming a gel comprising 35% methanol, 50% isopropanol, and 15% PVB by volume. In the second instance, a sheet of PVB was dissolved in glycol ether DPM to form a gel comprising 10%/90% PVB/ether by volume.

Each of these viscous gels were individually mixed with copper chloride ($CuCl_2$), the metal salt component, in an amount which provided the gel with about 0.5% by weight of the copper chloride. The ionic conductivity of the gel was determined to be about $10^{-4}$ $(ohm \cdot cm)^{-1}$ at room temperature. This viscous gel was light yellow in color. Then LiCl was added to the gel in an amount to provide about 0.5% by weight of this ion conduction enhancer. The ionic conductivity of the gel was found to increase to about $10^{-3}$ $(ohms \cdot cm)^{-1}$ due to the addition of the LiCl.

To form the electrochromic device, one electrode coated glass substrate was first framed with a PVB gasket 1 mm thick and 0.5 cm wide. Then one of the viscous gel matrix materials (PVB/$CuCl_2$/LiCl) prepared above was provided on the electrode layer within the area defined by the gasket. The matrix material was heated for about 1 hour at 50° C. to dry the gel somewhat. Then the other electrode/glass substrate combination was placed against the matrix material and compressed until the matrix material made uniform contact with each electrode layer. In the same way, a device was formed of the second gel matrix material made above.

A voltage (3 volts) was then applied across the electrode layers and a metallic copper color appeared near the cathodic electrode side of the device in less than 1 minute, independent of the type of PVB gel material used in the device. The other side of the devices appeared dark green and exhibited a few small bubbles. The devices returned to their initial appearance, i.e., light yellow in color, after the voltage source was disconnected from the devices. This took about 10 minutes which would designate these devices as not having a memory. The devices are cycled repeatedly by applying a voltage and then disconnecting the voltage source and perform very well. Application of a reversed polarity, as compared to that described above, provided the metallic copper layer near the other electrode layer.

EXAMPLE 2

Electrochromic devices were prepared as described in Example 1 except that the $CuCl_2$ color forming salt was replaced with $NiCl_2$. The initial color of the devices was light green. When 3 volts is applied across the electrodes, a metallic nickel color appeared near the electrode of negative polarity (cathode). The devices have no memory as seen by the rapid return of the devices to their initial appearance when the voltage is removed.

EXAMPLE 3

This example describes an electrochromic display device made according to the present invention. A device is prepared as in Example 1 using Monsanto Butvar B-90 (trademark) powder except that the matrix further contained $TiO_2$ and $Bi_2O_3$ finely ground powder. These white powders were added to provide the matrix layer of the device with a white appearance. As prepared, the device is translucent with a light yellow color. When a voltage (3 volts) is applied across the electrodes, the cathodic side of the device exhibits a metallic copper color while the anodic side of the device maintains its translucent, white (light yellow) appearance.

EXAMPLE 4

This example further describes use of a counter electrode in an electrochromic device according to this invention. The electrode layer of a substrate/electrode combination as made in Example 1 is coated with a 0.5 micron thick layer of $WO_3$ by thermal evaporation of $WO_3$ powder. This coating (counter electrode material) is then exposed to a solution of 1 molar $LiClO_3$ in propylene carbonate and colored electrolytically until 50% visible transmittance is obtained for the system (glass/electrode/counter electrode). The system is then taken from the solution, rinsed with distilled water and dried with blowing hot air. This colored system was used as in Example 1, along with another glass/electrode combination as made in Example 1, to form an electrochromic device.

A voltage (+2 volts) is applied to the electrode adjacent the counter electrode $Li_xWO_3$. A metallic copper layer develops near the other (cathodic) electrode layer. Use of the counter electrode is seen to improve the rate of coloration of the device and minimizing gassing at the anode. It is believed that when the voltage is applied as described above, extraction of each $Li^+$ and electron from the $WO_3$ film is compensated by the electrodeposition of a copper ion which converts to a metallic copper atom at the electrode which improve the formation rate of the metal layer. Such a device would be useful, e.g., as a switchable window.

In view of the disclosure, many modifications of this invention will be apparent to those skilled in the art. It is intended that all such modifications which fall within the true scope of this invention be included within the terms of the appended claims.

I claim

1. An electrochromic device comprising a substrate; a first electrode layer provided on said substrate; an electrochromic matrix material layer in contact with said first electrode member; and a second electrode layer in contact with said electrochromic matrix material layer, at least one of said first and second electrode members being transparent, said electrochromic matrix material layer consisting essentially of a substantially uniform mixture of: (i) a metal salt component selected from the group consisting essentially of halides, acetates, nitrates, sulfates, and phosphates of metals selected from the group consisting essentially of copper, cobalt, nickel, lead, rubidium, molybdenum and tin; (ii) an ion conductive material component selected from a group consisting essentially of solid electrolytes and gel electrolytes; and (iii) an ion conduction enhancer component selected from the group consisting essentially of lithium salts and sodium salts.

2. The device according to claim 1, wherein said metal salt is present in said electrochromic matrix material layer in an amount sufficient to provide a maximum thickness of between about 500 to 1000Å of the metal of said metal salt on one of said first and second electrode members when a voltage is applied across said electrodes.

3. The device according to claim 1, wherein said first and second electrode members are individually selected from electrode material consisting essentially of doped or undoped (a) tin oxide, (b) indium oxide, (c) indium tin oxide, (d) zinc oxide, and (e) mixtures of any of them.

4. The device according to claim 1, wherein said solid ion conductive material is selected from polymeric electrolytes, and inorganic oxide electrolytes.

5. The device according to claim 1, wherein said lithium salt and said sodium salt are selected from compounds comprising nitrates and halides of these alkali metals.

6. The device according to claim 1, wherein said device further comprises a second substrate adjacent said second electrode member.

7. The device according to claim 6, wherein both of said substrates is transparent.

8. The device according to claim 1, wherein one of said first and second electrode members is a continuous layer and the other electrode member is a patterned layer.

9. The device according to claim 1, wherein one of said first and second electrode members is a continuous layer and the other electrode member is a sliding point or linear electrode.

10. The device according to claim 1, wherein said device further comprises a counter electrode positioned between one or said first and second electrode members and the adjacent surface of said electrochromic matrix material layer.

11. The device according to claim 1, utilized as a divider between interior portions of a vehicle.

12. The device according to claim 1, utilized as a sunroof or a moonroof.

13. The device according to claim 1, utilized as a vehicle window.

14. The device according to claim 1, utilized as an architectural window.

15. The device according to claim 1, utilized as a skylight or an interior building partition.

16. The device according to claim 1, utilized as a display device.

17. A method for making an electrochromic device, which method comprises:

providing a first electrode layer on a substrate;

Providing an electrochromic matrix material layer in contact with said first electrode member; and providing a second electrode layer in contact with said electrochromic matrix material layer, at least one of said first and second electrode members being transparent, said electrochromic matrix material layer consisting essentially of a substantially uniform mixture of: (i) a metal salt component selected from the group consisting essentially of halides, acetates, nitrates, sulfates, and phosphates of metals selected from the group consisting essentially of copper, cobalt, nickel, lead, rubidium, molybdenum and tin; (ii) an ion conductive material component selected from a group consisting essentially of solid electrolytes and gel electrolytes; and (iii) an ion conduction enhancer component selected from the group consisting essentially of lithium salts and sodium salts.

* * * * *